United States Patent
Panchalingam et al.

(10) Patent No.: US 11,924,160 B2
(45) Date of Patent: Mar. 5, 2024

(54) APPLICATION AWARENESS IN A DATA NETWORK WITH NETWORK ADDRESS TRANSLATION

(71) Applicant: Cisco Technology, Inc., San Jose, CA (US)

(72) Inventors: Murukanandam Panchalingam, Dublin, CA (US); Umamaheswararao Karyampudi, Fremont, CA (US); Sudhakar Chunduru, Dublin, CA (US); Junyun Li, San Jose, CA (US); Ajay Kumar Modi, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/677,560

(22) Filed: Feb. 22, 2022

(65) Prior Publication Data
US 2023/0046070 A1 Feb. 16, 2023

Related U.S. Application Data

(60) Provisional application No. 63/232,063, filed on Aug. 11, 2021.

(51) Int. Cl.
| | |
|---|---|
| *G06F 15/16* | (2006.01) |
| *H04L 61/2503* | (2022.01) |
| *H04L 101/622* | (2022.01) |

(52) U.S. Cl.
CPC .... *H04L 61/2503* (2013.01); *H04L 2101/622* (2022.05)

(58) Field of Classification Search
CPC .............. H04L 61/2503; H04L 2101/622

USPC .................. 709/245–246, 238–239
See application file for complete search history.

(56) References Cited

U.S. PATENT DOCUMENTS

| | | | |
|---|---|---|---|
| 8,069,244 B2* | 11/2011 | Wiryaman | H04L 63/20 709/225 |
| 8,339,959 B1 | 12/2012 | Moisand et al. | |
| 9,055,117 B1 | 6/2015 | Dickinson et al. | |
| 9,876,689 B1* | 1/2018 | Gan | H04L 41/26 |
| 10,791,088 B1* | 9/2020 | Amdahl | H04L 61/5014 |
| 10,826,725 B1 | 11/2020 | Wei | |
| 10,999,125 B1 | 5/2021 | Srinath et al. | |

(Continued)

OTHER PUBLICATIONS

PCT Search Report and Written Opinion dated Oct. 14, 2022 for PCT application No. PCT/US2022/038521, 14 pages.

*Primary Examiner* — Bharat Barot
(74) *Attorney, Agent, or Firm* — Lee & Hayes P.C.

(57) ABSTRACT

Techniques for management of traffic in a network. The techniques provide application awareness in a Network Address Translation (NAT) system. In some examples, a first traffic is received at a first switch in a network from a first application hosted behind the first switch. The first switch identifies a first resource tag associated with the application from the first traffic. Further, the first switch identifies a first rule from the first resource tag indicating that the first traffic is to be routed through an intermediate device that performs network address translation. Moreover, the first switch transmits the traffic to an intermediate device, which perform NAT to translate the source IP address of the first traffic to a second IP address. Finally, the intermediate device sends the traffic to a destination device indicated by the first traffic.

19 Claims, 7 Drawing Sheets

(56) References Cited

U.S. PATENT DOCUMENTS

| | | | |
|---|---|---|---|
| 10,999,242 B1* | 5/2021 | K ........................ | H04L 61/2517 |
| 2003/0065812 A1 | 4/2003 | Beier et al. | |
| 2012/0163180 A1 | 6/2012 | Goel | |
| 2016/0094480 A1* | 3/2016 | Kulkarni ............. | H04L 47/2441 |
| | | | 370/230 |
| 2018/0131624 A1* | 5/2018 | Samadani ........... | H04L 63/1408 |
| 2018/0157514 A1* | 6/2018 | Malloy ................. | H04L 45/306 |
| 2018/0278523 A1* | 9/2018 | Ong .................... | H04L 61/2517 |
| 2020/0177503 A1 | 6/2020 | Hooda et al. | |
| 2021/0099450 A1 | 4/2021 | Jain et al. | |

* cited by examiner

APPLICATION AWARENESS IN A DATA NETWORK WITH NETWORK ADDRESS TRANSLATION

CROSS REFERENCE TO RELATED APPLICATIONS

This application claims priority to U.S. Provisional Patent Application No. 63/232,063, filed Aug. 11, 2021, the entire contents of which are incorporated herein by reference.

TECHNICAL FIELD

The present disclosure relates generally to techniques for application awareness in a data network with Network Address Translation (NAT). More specifically, it is directed to extending application awareness to a classic network architecture to enable a truly distributed NAT functionality in modern data centers.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller or orchestrator such that the control plane is abstracted from the data forwarding functions in the discrete networking devices. The SDN orchestrator is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allows the SDN controller to directly interact with the forwarding plane of network devices (such as switches and routers) using, for example, various application programming interfaces (APIs).

Traditionally, SDN controllers and switches use Network Address Translation techniques to map an unregistered IP address to a registered IP address by modifying network address information included in the IP header of incoming packets while they are in transit traffic across routing device. Before a switch or router forwards a packet, it translates the private internal network address into a globally unique address. In a NAT network, a unique IP address represents an entire group of computers. In addition, in NAT, a network device, often a router or NAT firewall, assigns a computer or computers inside a private network a public address. In this way, NAT allows the single device to act as an intermediary or agent between the local, private network and the public network that is the internet. NAT's main purpose is to conserve the number of public IP addresses in use, for both security and economic goals. In some examples, multiple networks may be assigned with their own private IP address space, while trying to access a common or shared network. In this scenarios, NAT can be used to translate the private address among these network can be to the shared network IP address.

In NAT configuration, one IP address is assigned for an entire network to the outside world, effectively hiding the entire internal network and providing additional security. NAT is typically implemented in remote-access environment, as offers the dual functions of address conservation and enhanced security.

Various challenges arise when deploying NAT in a data network. For instance, the performance bottleneck caused by the NAT traditional client-server structure brings low reliability to the data network. In some other examples, when multiple applications are hosted in the same network device, NAT session setup treats the applications with the same priority and awareness. Thus, to improve the network reliability and efficiency, there is a need for techniques and methods to provide cooperation between network devices in the NAT or multiple NAT systems. Additionally, these techniques and mechanism may enable application awareness in the NAT network. Accordingly, such mechanisms may improve the overall network performance, reliability, and user experience by improving the router performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques and mechanisms to provide application awareness in distributed Network Address Translation (NAT) configuration. Traditionally, NAT functionality maps network layer 3/layer 4 address into a different space when an IP packet traverses a router or switch. Further, this disclosure extends network layer3/layer 4 NAT to network layer 7.

This disclosure further describes a method for a network controller to manage traffic in the network. the method may be performed using control-plane techniques by the network controller component (e.g., software defined network (SDN) controller). The method may include receiving, at a first switch in a network, first traffic from a first application hosted behind the first switch. The first switch may identify from the first traffic, a first group tag associated with the application. Further, the first switch may identify, using the first group tag, a first rule indicating that the first traffic is to be routed through an intermediate device that performs network address translation. Later, the first switch may send the first traffic to the intermediate device. The intermediate device (e.g., a switch or router) may receive the first traffic at the intermediate device. Once the intermediate device receives the traffic, it translates using network address translation (NAT) at the intermediate device, a source address of the first traffic from a first IP address associated with the application to a second IP address obtained from the NAT pool at the intermediate device. Finally, the intermediate device may send the first traffic to a first destination address indicated in the first traffic.

Additionally, the techniques described herein may be performed by a system and/or device having non-transitory computer-readable media storing computer-executable instructions that, when executed by one or more processors, performs the method described.

EXAMPLE EMBODIMENTS

Computer networking has continued to evolve and become more complex in terms of how network devices are controlled or instructed to communicate data through network architectures. For instance, SDN technologies emerged, continue to evolve, and generally include using a network controller such that the network services are separated from the network devices, while automatically configuring the network services from the network devices as per the service specifications provided.

A network controller is built to manage and configure traffic at the routers and switches. It has intimate knowledge of network's configuration, architecture, infrastructure elements, users and their devices, and traffic patterns.

In some scenarios, the network may perform a Network Address Translation (NAT) protocol to manage routing and forwarding the traffic from a first network device to a second network device. If the network devices in a network are configured with NAT, a unique IP address represent an entire group of network devices, and the controller assigns the network devices (e.g., routers, switches) a private or public address. In this way, network address translation allows the single device to act as an intermediary or agent between local, private network and the public network.

NAT converses IP addresses by enabling private IP networks using unregistered IP addresses to connect to a public network. In NAT configuration, a network device (e.g., switch or router) translates the private internal network into a globally unique address. Since the NAT configuration reveals just one IP address for an entire network to an outside network, effectively hiding the entire internal network, and thus providing additional security. Additionally, NAT permits a single device, such as a router or switch to act as an intermediate device between a private network and a public network.

A common approach for NAT configuration is to have an interface on a switch or router inside a private network and another interface on a switch or router outside of the public network, and a set of rules for translating the IP packet address. In this approach, whenever a device inside the private network needs to communicate with another device outside the network or in a public network, the switch or router translates the unregistered local IP address on the private network to a registered IP address in the public network. This allows an entire group of devices to be represented by a single unique IP address when they do connect outside network. Traditional Data Center Networks thus look into only the Layer 3 and Layer 4 fields in the packets to affect this translation.

An End Point Group (EPG) includes a collection of endpoints devices (e.g., network Virtual Machine (VM)) that can have common policies. In other words, EPG uniquely maps to the different applications based on their network constructs like Virtual Local Area Network (VLAN)/Virtual Extensive LAN identifiers and IP/MAC addresses. Therefore, instead of defining the policies for a VM//network device, the policies may be defined for EPG or the application it maps into. In some scenarios that the application may be virtual and hosted in a VM server. In these scenarios, if the VM moves within the data center, the associated EPG policies may also move with it. Every EPG in an EPG group may be associated with a 'Group TAG' or 'ClassID'.

In some examples, contract policy rules for a set of data nodes are described. The contract policy rules specify the communication between EPGs and a whitelist model. The whitelist may allow some identified entities to access a particular privilege, service, mobility, or recognition. The contract policy rules may be comparable to a Network Access Control List (ACL) which is an optional security for Virtual Private Cloud (VPC), and act as a firewall for controlling traffic out of or more network devices. The contract policy rules can add an additional layer of security to the VPC. Further, the contract may be applied at a more granular level between the applications and EPGs. In some examples, the EPG contract model in which the policies can move with application VM, may provide a means for optimal enforcement of the aforementioned policies In some examples, rules are enforced when the traffic enters the data center server (e.g., client to server direction) or exits the data center (e.g., server to client). In some examples EPG policies are enforced for the forward direction traffic (e.g., client to server) or the return traffic (e.g., server to client). Further, this rule enforcement model for fabric may enable the fabric to be more intelligent, and can provide handshake techniques between switches with forward traffic and reverse traffic in the fabric. It is noted that, the rules may be enforced once in the fabric either for the forward direction traffic or the reverse direction traffic. In other words, the distributed fabric behaves as one intelligent big switch with handshake between switch which handles forward and reverse direction traffic.

In some examples, the techniques described herein includes a method for managing traffic for a set of data nodes. In some examples, a traffic may be received from a first application hosted behind a first switch. The method may identify a first group tag associated with the application. Further, the method may identify from the first group tag a first rule indicating that first traffic is to be routed through an intermediate device (e.g., another switch in the data center), which may use NAT to translate the traffic private address to a public address. Once the intermediate device translates the address, it may send the traffic to a second device. For instance, part of an application may be hosted behind a first switch and a server, and another part of the application may be hosted under a second switch. NAT may be used to translate the Layer 3 address and Layer 4 port space from the private space to the public space or vice versa. In some examples, the first switch may be enforced to be an switch handling forward direction traffic, and thus source NAT for the client to server forward direction may be performed at the first switch, while the second switch may be enforced to be node for handling reverse traffic, and destination NAT for the return direction server to client may be performed at the second switch.

Further, the techniques described herein provides a method for application-awareness traffic management. In some examples, a second traffic may be received from a second application hosted behind the second switch. The method, may identify a second group tag from the second traffic, and identify a second rule from the second group tag indicating that the second traffic is to be routed through the intermediate device which may use NAT to translate the traffic private address to the public address. Further, the method may identify from the second rule that the second application is a high priority application or a low priority application. In some examples, the method may replace the MAC address of the second traffic with a first address that is associated with the high priority traffic. In some other examples, the method may replace the MAC address of the second traffic with a second address that is associated with a low priority traffic. Lastly, the method proceeds with processing the second application based on its priority.

It is worth to mention that the same intermediated device (e.g., an intermediate switch) used to route the first traffic in the forward direction, may be used to route the second traffic in the reverse direction, since the NAT state is maintained at the intermediate device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
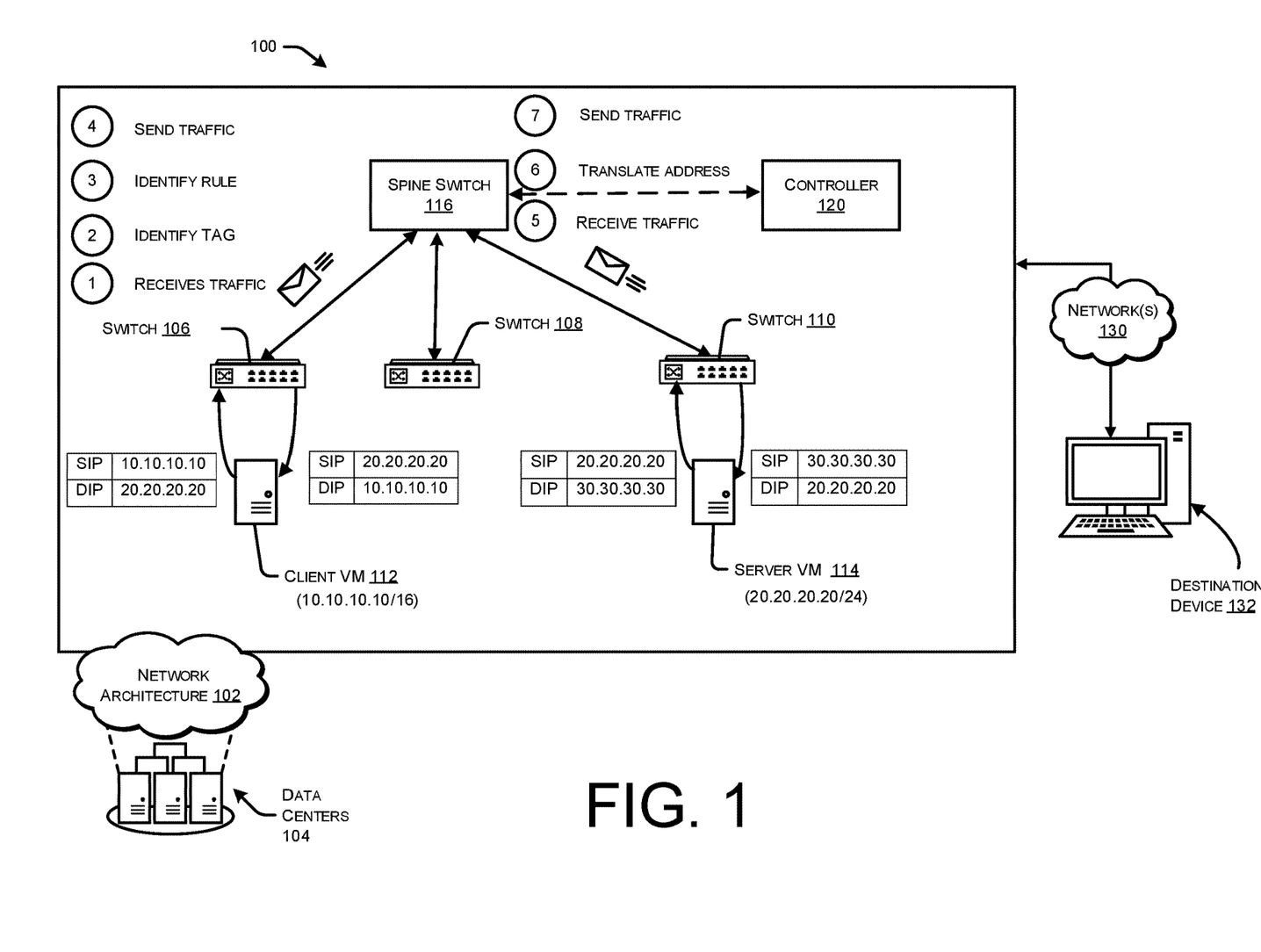
FIG. 1 illustrates a system diagram of network architecture of a static NAT configuration in data centers.

FIG. 1 illustrates a system diagram of network architecture 100 of a static NAT configuration in data centers.

System architecture 100 includes a network architecture 102 that may include one or more data centers 104, and in which destination device 132 utilizes a user interface to configure data nodes to perform network operations. System architecture 100 further illustrates a network controller 120 in the network architecture 102 deploying NAT configuration in the network architecture 102. The spine switch 116 interconnects the switches 106, 108, and 110 to the other network devices.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The destination device 132 may establish communication connections over one or more networks 130 to communicate with devices in the network architecture 102, such as a network controller 120 of the network architecture 102. The network(s) 130 may include any viable communication technology, such as wired and/or wireless modalities and/or technologies. Networks 130 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The destination device 132 may communicate using any type of protocol over the network 130, such as the transmission control protocol/ Internet protocol (TCP/IP) that is used to govern connects to and over the Internet.

The switches 106, 108, 110 may include one or more switches housed or located in one or more sever racks. The switches 106,108,110 may interconnect nodes in the network 130 to nodes in the network 102. The switches 106, 108, 110 may be implemented in hardware and software, and may move the IP packet from the network 130 to the network 102 or vice versa. The switches 106, 108, 110 may use of a shared memory (e.g., RAM), and data buffers shared among different switches. The switches 106, 108, 110 may include a device deployable configuration including switch parameterized elements (variables) and control logic statements. The switch configuration may define the switch functionality, and enables to move the data packet between the different nodes of the network 130 and 102. In some examples, the switch configuration may be configured via a user interface by the destination device 132. In some examples, the switch configuration may be configured by the controller 120.

The servers 112, 114 housed or located in one or more sever racks manage access to the network 102. In some example, the server 112, 114 may be database servers, file servers, mail servers, print servers, web servers, game servers, and application servers. The servers 112, 114 may provide functionality for the users and devices in the network 102 and 130. In addition, the servers 112, 114 may provide shared services such as sharing data or resources among multiple users of the network 130, 102, or performing computation for a user.

The switch 106 may connect a client Virtual Machine (VM) 112 to the spine switch 116. The switch 110 may connect a server VM 114 to the spine switch 116. A first EPG associated to a first application may be hosted behind switch 106 and client VM 112, and a second EPG associated to a second application may be hosted behind switch 110 and server VM 114. The controller 120 manages, configure and monitors network devices and switches (e.g., switches 106, 108, 110). As shown, in the forward client direction the NAT may change private address 10.10.10.10 to public address 30.30.30.30 for the first; in the reverse server to client direction, the NAT may change the private address 30.30.30.30 to public address 10.10.10.10 for the second application.

At "1," the switch 106 may receive a traffic from an application hosted under the VM 112. A first part of the first traffic may be hosted under the switch 106 and client VM 112; a second part of the first traffic may be hosted under the switch 110 and VM sever 114. For instance, the client VM 112 may be identified by the IP address 10.10.10.10/16, and the server VM 114 may be identified by the IP address 20.20.20.20/24. In the forward client to server direction, the application may be identified by the source address 10.10.10.10 and the destination address 20.20.20.20. In the reverse direction server to client direction, the application may be identified by the source address 30.30.30.30 and the destination address 20.20.20.20.

At "2", the switch 106 may identify a group tag from the application. The group tag may include a source tag, a source address, a destination tag, and a destination address. In some examples, the source tag may be derived from the source address, and the destination tag derived from the destination. The destination address may identify the application source private address, and may determines that private address may be required to be translated to a public address. The destination address may identify another application or another network to which the application will be routed. In some examples, the source and destination tags may be used in an ACL lookup table to find the rule indicating how traffic is routed through the intermediate device.

At "3", once the rule is identified, the traffic may be routed from the switch 106 to the switch 110 in the forward client to server direction via the intermediate switch 108. The rule may also determine the load-balancing between the switches 106 and 110, and may also indicate the routing path from source to the destination. In some examples, the intermediate switch 108 may be physically be presented by the switch 106. In some examples, the intermediate switch 108 may be physically be presented by the switch 106.

At "4", the traffic is transmitted from the switch 106 to the intermediate switch 108 according to the source address, destination address, load-balancing, and routing path determined by rule.

At "5", the intermediate switch 108 receives the traffic. Upon receiving a packet from the switch 106, the switch 108 may search the IP address of the received packet in an address translation table. If a match is found, the switch 108 may translate the private IP address of the traffic to a public address. Otherwise, the switch 108 may drop or reject the traffic.

At "6", the switch 108 may establish a NAT session, and replace the Layer 3 and Layer 4 source private addresses of the traffic with the public addresses of the switch 106. The switch 108, may then make an entry in address translation table containing the private and public IP addresses. Thus, subsequent packets from the switch 106, may be translated to the same public address.

At "7", the switch 108 may transmit the traffic to the switch 110. Upon receiving the traffic at the switch 108, the switch 108 may search an address table to determine if incoming traffic address and port number is valid. If the IP and port number of traffic is valid, the traffic is forwarded to the server VM 114.

It is appreciated that in the forward client to server direction described above, the switch 106 acts a node handling forward direction traffic. In reverse direction the switch 110 acts as a node for handling reverse direction traffic. Similar to the process described above for the forward direction, in the reverse direction the traffic is routed from switch 110 to the switch 106 via the intermediate device 108. However, the forward direction Source NAT (SNAT) may be more straightforward than the reverse direction Destination NAT (DNAT), because only source IP address of the traffic is changed, and routing the traffic within the fabric switches is not hindered. In the reverse direction, since the return traffic destination IP address is not DNAT-ed in layer three, the fabric switches cannot route the traffic. As shown, in the reverse direction the source public address 30.30.30 will be translated to the private address 10.10.10.10, and the packet is routed from the server VM 114 to the client VM 112 via switch 108.

In some examples, the process described above may be implemented by hardware and software agnostic model, where reliance on hardware or a specific platform is not required. A hardware-agnostic system may not require any modifications to run on a variety of network devices. Thus, hardware agnostic design brings about a high level of compatibility across most common network devices which is suitable for a brownfield environment.

Figure 2:
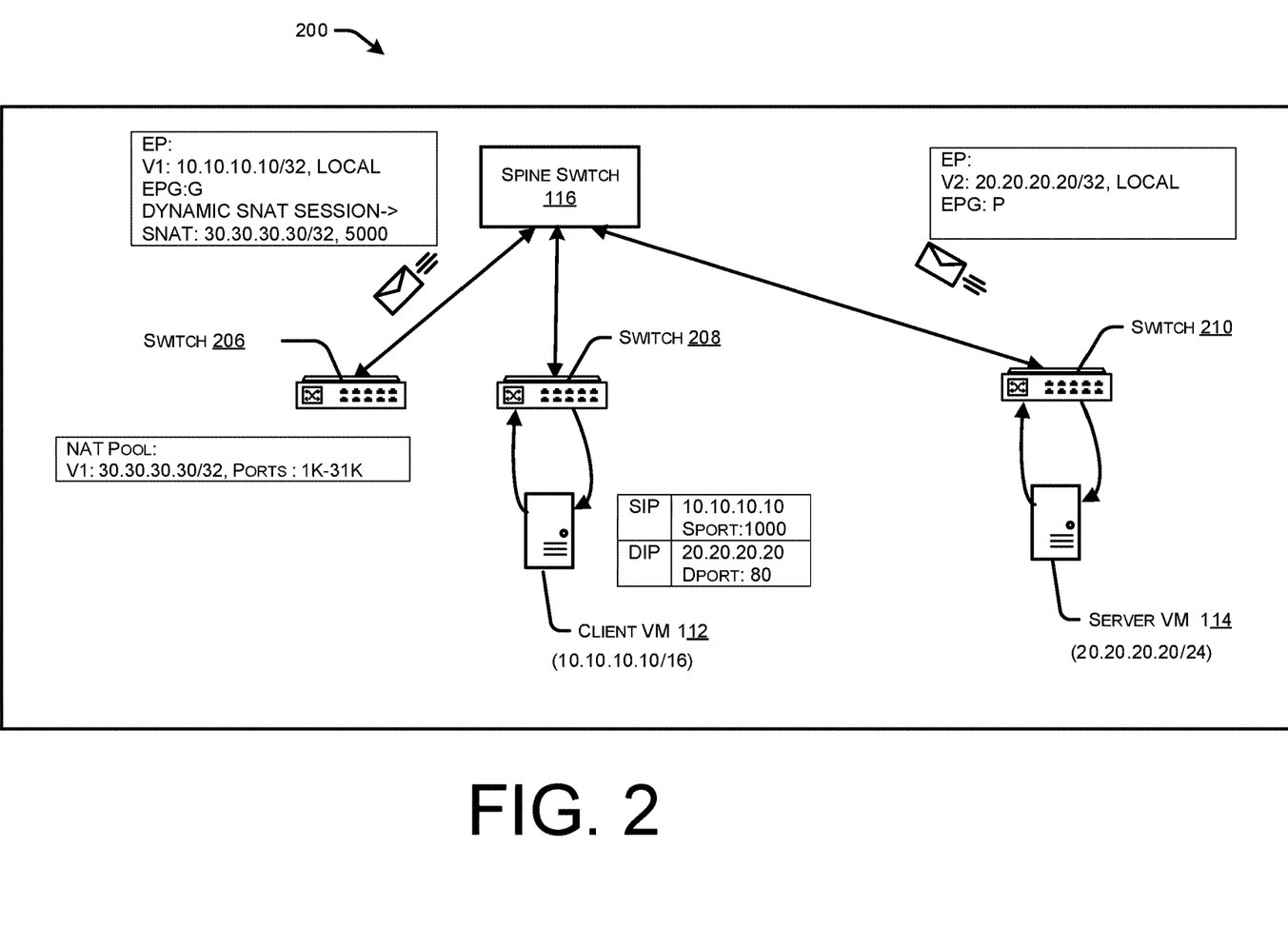
FIG. 2 illustrates a system diagram of network architecture of a distributed NAT configuration in data centers with endpoint mobility

FIG. 2 illustrates a system diagram of network architecture of a distributed NAT configuration in data centers with endpoint mobility. System architecture 200 includes switches 206, 208, and 210. The switch 206 is connected with the client VM 112, and the switch 210 is connected with the VM 114. System architecture 200 further illustrates a spine switch 116 in the network architecture interconnects the switches 206, 208, and 210 to the other network devices.

The switches 206, 208, 210 may include one or more switches housed or located in one or more sever racks. The switches 206,208, 210 may interconnect nodes in the network 130 to nodes in the network 102. The switches 206, 208, 210 may be implemented in hardware and software, and may move the IP packet from the network 130 to the network 102 or vice versa. The switches 206, 208, 210 may use of a shared memory (e.g., RAM), and data buffers shared among different switches. The switches 206, 208, 210 may include a device deployable configuration including switch parameterized elements (variables) and control logic statements. The switch configuration may define the switch functionality, and enables to move the data packet between the different nodes of the network 130 and 102. In some examples, the switch configuration may be configured via a user interface by the destination device 132. In some examples, the switch configuration may be configured by the controller 120.

In some examples, when many applications will be hosted behinds VMS (e.g., modern data centers), virtual workload migration within the data centers may be required to be handled. For example, VM 112 of FIG. 1 hosted behind switch 106, may move to be hosted behind the switch 206 of FIG. 2. In some examples, it may be required that when the VM moves from being hosted behind one switch to another switch, the processing of the existing application running behind the VM will not be halted. However, as shown, this may not be feasible with NAT, since the switch 208 may not have the dynamic NAT session 10.10.10.10/1000 to 30.30.30.30/5000 setup in the switch 206. Thus, control plane may be involved to distribute this session, which can increase software cost and consumes hardware resources. As illustrated, the switch 208 may be enforced as a switch for handling forward direction traffic, and the switch 210 may be enforced as a switch for handling reverse direction traffic. As illustrated, the private layer three address 10.10.10.10 may be mapped to the public address 30.30.30.30 in the forward client to server direction in the switch 308. Also, the layer four source port may be mapped from 1000 to 5000 in the forward client to server direction in the switch 308. In some examples, the NAT session may be set up dynamically in a context local to the switch 206.

Figure 3:
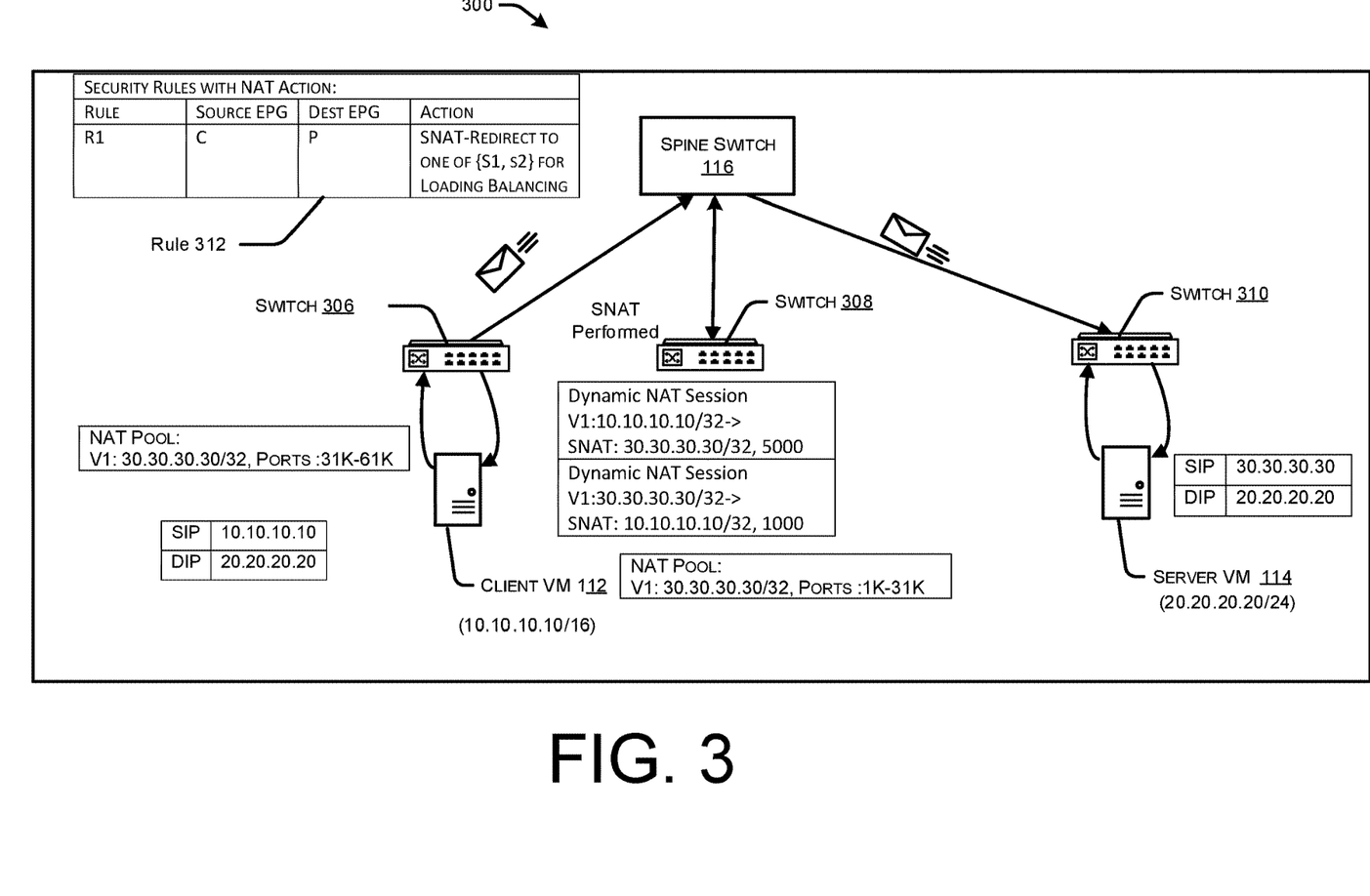
FIG. 3 illustrates a system diagram of network architecture of a Source NAT (SNAT) configuration in forward client to server direction.

FIG. 3 illustrates a system diagram of network architecture of a distributed NAT configuration in forward direction. System architecture 300 includes switches 306, 308, and 310. The switches 306 is connected with the client VM 112, and the switch 310 is connected with the VM 114. System architecture 300 further illustrates a spine switch 116 in the network architecture, which interconnects the switches 306, 308, and 310 to the other network devices.

The switches 306, 308, 310 may include one or more switches housed or located in one or more sever racks. The switches 306,308, 310 may interconnect nodes in the network 130 to nodes in the network 102. The switches 306, 308, 310 may be implemented in hardware and software, and may move the IP packet from the network 130 to the network 102 or vice versa. The switches 306, 308, 310 may use of a shared memory (e.g., RAM), and data buffers shared among different switches. The switches 306, 308, 310 may include a device deployable configuration including switch parameterized elements (variables) and control logic statements. The switch configuration may define the switch functionality, and enables to move the data packet between the different nodes of the network 130 and 102. In some examples, the switch configuration may be configured via a user interface by the device 132. In some examples, the switch configuration may be configured by the controller 120.

In some examples, some of switches in a fabric (e.g., switch 306, 308, 310) may be assigned to have double roles of being a service leaf and a switch in addition to their regular workload handling. For instance, the switches 306 and 308 may be selected to have double roles as service leaves, where the NAT pool address being split amongst themselves. As illustrated, switch 306 and 308 will have the same global address 30.30.30.30, while the four ports 31K-61K are assigned to the switch 306, and the ports 1K-31K are assigned to switch 308.

In some examples, the traffic received at the switch associated to an application, may include: (i) A source tag identifying the application or EPG requiring source address translation. (ii) A rule indicating that the traffic may be routed through the switch 308. (iii) A destination tag indicating another application in another Virtual Routing and Forwarding (VRF) the application is communicating with (iv) Additional layer four parameters such as Transmission Control Protocol (TCP) or User Datagram Protocol (UDP) specific ports.

Example rule 312 shows an example of the SNAT of the receiving traffic associated to an application. In this example, the traffic designated for the SNAT may distribute its load between switches 306, and 308, and may be serviced at the switch 308. Once the forward direction traffic client to server traffic is received at the switch 308, the NAT session may be established, and the SNAT can be effected by changing the layer three source address 10.10.10.10 to 30.30.30.30, and layer four source port from 1000 to 5000.

Figure 4:
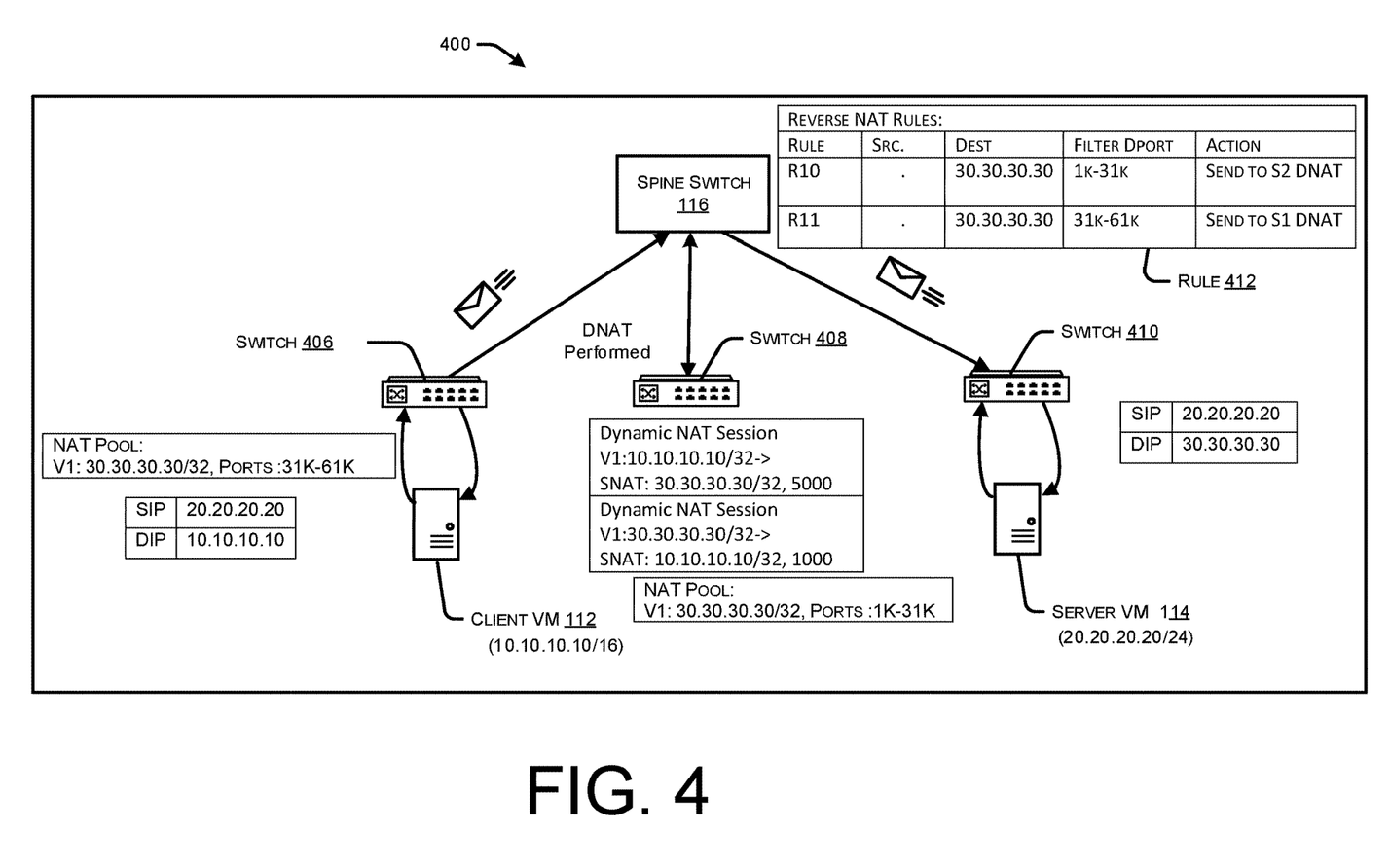
FIG. 4 illustrates a system diagram of network architecture of a Destination NAT (DNAT) configuration in reverse server to client direction.

FIG. 4 illustrates a flow diagram of an example method for a network controller component to determine configuration changes in the configuration of the network devices and update configuration of the network devices. System architecture 400 includes switches 406, 408, and 410. The switch 406 is connected with the client VM 112, and the switch 410 is connected with the VM 114. System architecture 400 further illustrates a spine switch 116 in the network architecture interconnects the switches 406, 408, and 410 to the other network devices.

The switches 406, 408, 410 may include one or more switches housed or located in one or more sever racks. The switches 406,408, 410 may interconnect nodes in the network 130 to nodes in the network 102. The switches 406, 408, 410 may be implemented in hardware and software, and may move the IP packet from the network 130 to the network 102 or vice versa. The switches 406, 408, 410 may use of a shared memory (e.g., RAM), and data buffers shared among different switches. The switches 406, 408, 410 may include a device deployable configuration including switch parameterized elements (variables) and control logic statements. The switch configuration may define the switch functionality, and enables to move the data packet between the different nodes of the network 130 and 102. In some examples, the switch configuration may be configured via a user interface by the device 132.

In some examples, the service switch 410 may be set up the NAT session for forward client to server traffic, and may install the reverse direction session to handle the return direction server to client traffic. For example, the reverse session for performing DNAT in the switch 410 can be presented as:

Layer 3 destination address 30.30.30.30, and layer four destination port 5000 may be mapped to Layer three destination address 10.10.10.10, and layer four destination port 1000.

In order to route the traffic to the switch 410, the switch 410 may be enforced as a switch with reverse direction traffic. Additionally, the traffic received at the switch associated to an application, may include: (i) A source tag identifying the application or EPG requiring source address translation. (ii) One or more rules indicating that the traffic may be routed through the switch 408. (iii) A destination tag indicating another application in another Virtual Routing and Forwarding (VRF) the application is communicating with (iii) Additional layer four parameters such as Transmission Control Protocol (TCP) or User Datagram Protocol (UDP) specific ports.

Rule 412 shows an example of the DNAT of the receiving traffic associated to an application. The rules R10, and R11 illustrated in 412 determine how the traffic may be routed from the switch 410 to the switch 408. For instance, the rule R10 may match NAT pool assigned to the service switch 408, i.e. 30.30.30.30/32, layer four ports 1$k$-31$k$. Similarly, the rule R11 may match the NAT pool configuration for the switch 406. When the return server to client traffic arrives the switch 410, the rule R10 may match, and thus this traffic may be redirected to switch 408, which may map change the DNAT of Layer 3 address from 30.30.30.30 to 10.10.10.10, and the layer four destination port from 5000 to 10000. Once the traffic is received at the switch 408, the switch 408 may use a lookup table to send the traffic to the switch 406.

It is noted that since the switch 408 performs both the forward direction and reverse direction, there may not be any need to synchronize the states outside of the switch. This in turn may reduce the complexity of the distributed solution. In addition, the VM 114 may be moved from behind switch 408 to behind switch 410. The following items are the key factors that provide VM 114 mobility: (i) NAT-ing may not be affected in the switch 406 or switch 410, but rather it may be performed in the third switch 408, and it may be performed by the contract rules which may be installed in the switches 406 and 408. (ii) If the VM or endpoint which belongs to the application or EPG which needs NAT-ing moves to another switch in the fabric, the contract rules (e.g., R1 of FIG. 3) may also be moved to this switch. This in turn may move the traffic to the service switch 410 for SNAT-ing. (iii) In the reverse direction, the NAT pool may dictate where to send the traffic for DNAT-ing, and hence if the server VM belongs to the destination application or EPG which moves to another switch in the fabric, the related rules (e.g., R10 & R1) may also move to this switch, and may send the traffic back to the service switch 408 for DNAT-ing.

In some examples the application may be categorized as business critical which are given the highest priority within data centers or other applications which are given lower priority. When a business critical (crown jewel) application is hosted with a regular application under the same subnet, and this subnet may need NAT-ing to communicate to another network, the techniques described above may be used to prioritize the business casual application, and NAT configuration may be performed as (i) The switch 406 may pass some additional parameters included in the rule R1 of FIG. 4, since the R1 can clearly identify the source application as a crown jewel application/EPG.

(ii) The switch 406 may rewrite the layer two address destination mac address for client to server traffic to MAC1 for higher priority applications EPGs and MAC2 for other applications (iii) The service switch 408, may interpret the layer 2 destination mac address to decide to affect the NAT session setup.

In some examples, the service switch 408 may use an intelligent NAT session set up for configuring the switches. For examples, a heuristics approach may be used which may contains the following steps:

(i) If only 90% of available address/ports are used, fail NAT identified session may be requested for regular application, while the set up may be continued for crown-jewel applications. This can increase a guaranteed behavior in dynamic NAT for higher priority application.

(ii) If the 99% of available NAT address/ports are used, the switch 408 may run a timer to tear down sessions established for regular applications. This may be anticipated since a higher priority application may need an address/port to be processed.

(iii) Different sessions tear down timer may be required for different applications. Specifically, a higher timer may be used for higher priority application, and a lower aggress timer may be used for regular applications/EPGS.

Figure 5:
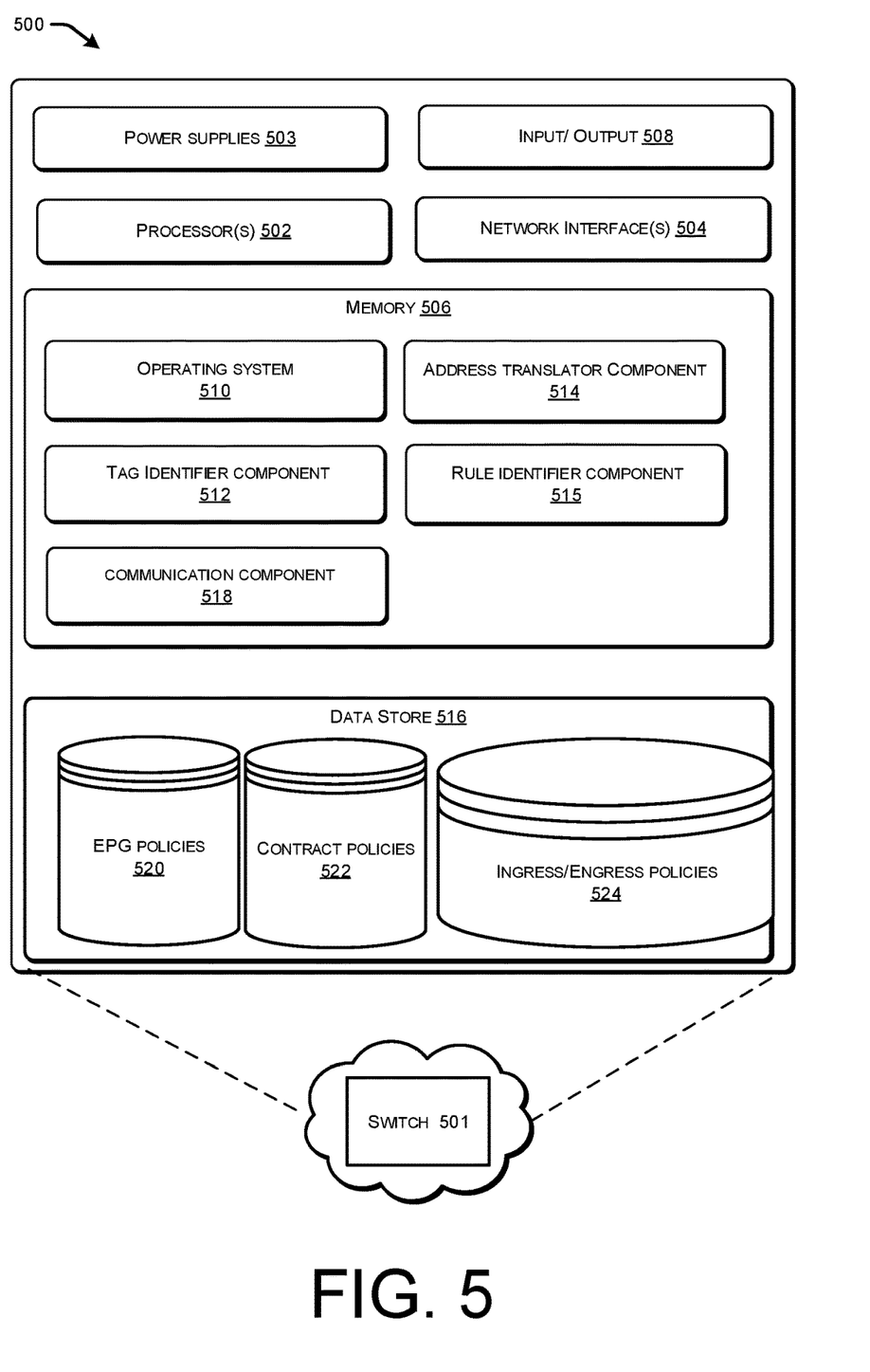
FIG. 5 illustrates a component diagram of an example an example network switch that can be utilized to implement aspects of the technologies disclosed herein.

FIG. 5 illustrates a component diagram of an example an example network switch 501 (e.g., 106, 108, 110, 206, 208, 210, 306, 308, 310, 406, 408, 410,) that can be utilized to implement aspects the technologies disclosed herein. The switch 501 may be any type of computing device capable of receiving expressions of fabric configuration parameterization via device 132 and sending data to the network 130 via a suitable data communications network device such as, but not limited to, a laptop or desktop computer, a tablet computing device, a server computer, a television, or a mobile telephone.

As illustrated, the controller 501 may include one or more hardware processors 502 (processors), one or more devices, configured to execute one or more stored instructions. The processor(s) 502 may comprise one or more cores. Further, the switch 501 may include one or more network interfaces 504 configured to provide communications between the switch 501 and/or other systems or devices in the network architecture 102 and/or remote from the network architecture 102. The network interfaces 504 may include devices configured to couple to personal area networks (PANs), wired and wireless local area networks (LANs), wired and wireless wide area networks (WANs), and so forth. For example, the network interfaces 504 may include devices compatible with Ethernet, Wi-Fi, and so forth.

The switch 501 can include one or more power supplies 503, such as one or more batteries, connections to mains power, etc. The switch 501 can also include one or more inputs and outputs 508 for receiving and processing input from a number of input devices, such as a keyboard, a mouse, a touchpad, a touch screen, an electronic stylus, or other type of input device. Further, the input/outputs 508 can include a display, such as a computer monitor, a flat-panel display, a digital projector, a printer, or other type of output device. It will be appreciated that the user device controller 501 might not include all of the components shown in FIG. 5, can include other components that are not explicitly shown in FIG. 6, or might utilize an architecture completely different than that shown in FIG. 6.

The switch 501 may also include memory 506, such as computer-readable media, that stores various executable components (e.g., software-based components, firmwarebased components, etc.). The memory 506 may generally store components to implement functionality described herein. The memory 506 may store an operating system 510 utilized to control the operation of components of the switch 501. Further, the memory 506 may store a communication component 518 that comprises software (e.g., any protocol stack) to enable the switch 501 to communicate with other devices using the network interface 504.

In some examples, the memory 506 may store a configuration-read component configured to enable the switch 501 to obtain the fabric configurations data. The fabric configuration data may include configuration data of fabric representing the switches functionality such as hardware settings, protocols, network service, accessibility, port configuration, etc. Additionally, the configuration data of each switch may represent the policies and rules of the switches. The read component may comprise a human readable code or binary machine code, when executed on the processor 502, may enable the switch 501 to access switches configuration, and obtain the switches configurations data via the network interface 504.

In some examples, the memory 506 may store a tag identifier component 512 configured to enable identify the group tag from the traffic arrived at the switch 501. The tag identifier component comprises a human readable code or binary machine code, when executed on the processor 502, may enable the switch 501 to identify group tag in the traffic associated to the application running on the switch 501.

In some examples, the memory 506 may store an address translator component 614 configured to translate the private address of the incoming traffic at the switch 501 to a public address. The address translator component may comprise a human readable code or binary machine code, when executed on the processor 502, may enable the switch 501 to establish a NAT session at switches (e.g., 10, 108, 110), and translate the private address and port number of the application related to the traffic to a public address. The NAT session may include a set of rules and look up tables specifying switches accessibility, private addresses, port numbers, public addresses, etc.

In some example, the memory 506 may store a rule identifier component 515 configured to identify from the incoming traffic at the switch 501 a rule indicating that how the traffic is to be routed through the network. The rule identifier component may comprise a human readable code or binary machine code, when executed on the processor 502, may enable the controller 501 to identify the rule from the traffic associated to an application running behind switch 501, and route the traffic to the destination according to the rule. The rule identifier component 515 may include a source tag, destination tag, and some additional parameters indicating the routing path and parameters required to route the packet.

The switch 501 may further include a data store 516, which may comprise any type of computer memory including long-term memory (e.g., Read Only Memory (ROM), Random Access Memory (RAM), caches, etc.). The data store 516 may include an EPG policies component 520 that includes a set of rules that are common in a set of endpoints devices such as NAT settings, NAT lookup tables, settings on hardware, protocols and network services, initially configured at the EPG or switch 501. The data store 516 may include a contract policies component that includes policy rules that specify how an EPG communicates with whitelist models and other network devices. Further, the data store 516, may include an forward/reverse traffic policies component that include policy rules enforced at the switches with VM mobility.

Figure 6:
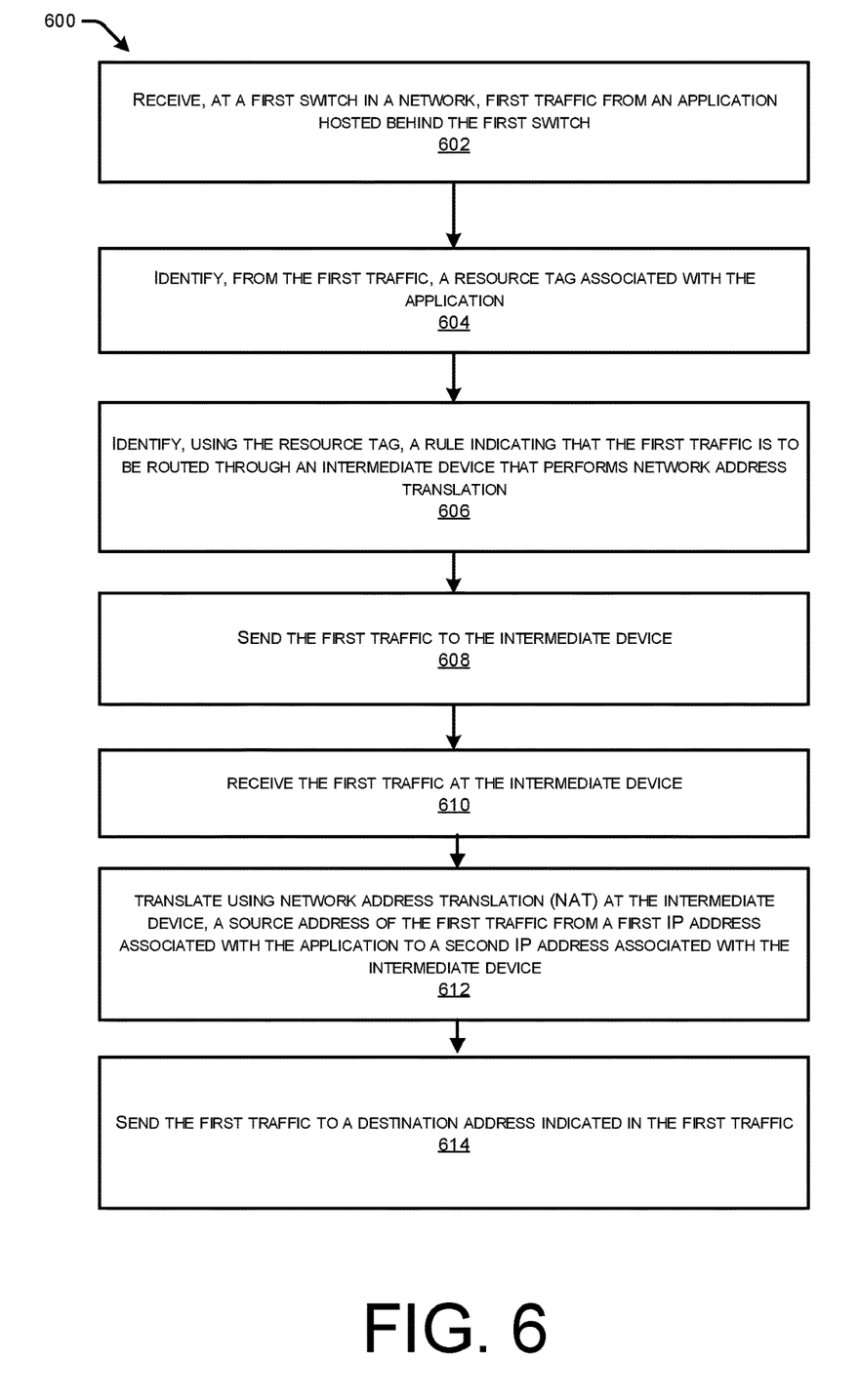
FIG. 6 illustrates a flow diagram of an example method for processing applications hosted in a network switch in a distributed NAT configuration.

FIG. 6 illustrates a flow diagram of an example method for processing applications hosted in a network switch in a distributed NAT configuration.

At step 602, a first switch may receive a first traffic. The first traffic may be associated to an application or EPG hosted behind the first switch. In some example the traffic may be client to server forward traffic, and the first switch may be enforced as an ingress switch.

At step 604, the first switch may identify from the first traffic, a group tag associated with application. The group tag may be included in the first IP packet header carrying the traffic, and includes routing information for the traffic.

At step 606, the first switch may identify a rule indicating that the first traffic is to be routed through an intermediate device that performs NAT. The rule may indicate the traffic path, where the NAT need to be performed, and a how to translate the private address to a public address, and which device the application wants to communicate.

At step 608, the first switch may send the first traffic to the intermediate device based on the rule.

At step 610, the intermediate device receives the first traffic from the first switch.

At step 612, the network translates a source address of the first traffic from the first IP address associated with application to second IP address associated with the intermediate device. The first IP address can be private address in the local network architecture, and the second IP address can be a private address in another network. The first switch may use a lookup table to perform NAT. If it finds a match for the first IP address in the look up table, it may forward the packet, and if it cannot find a match it may reject the packet.

Figure 7:
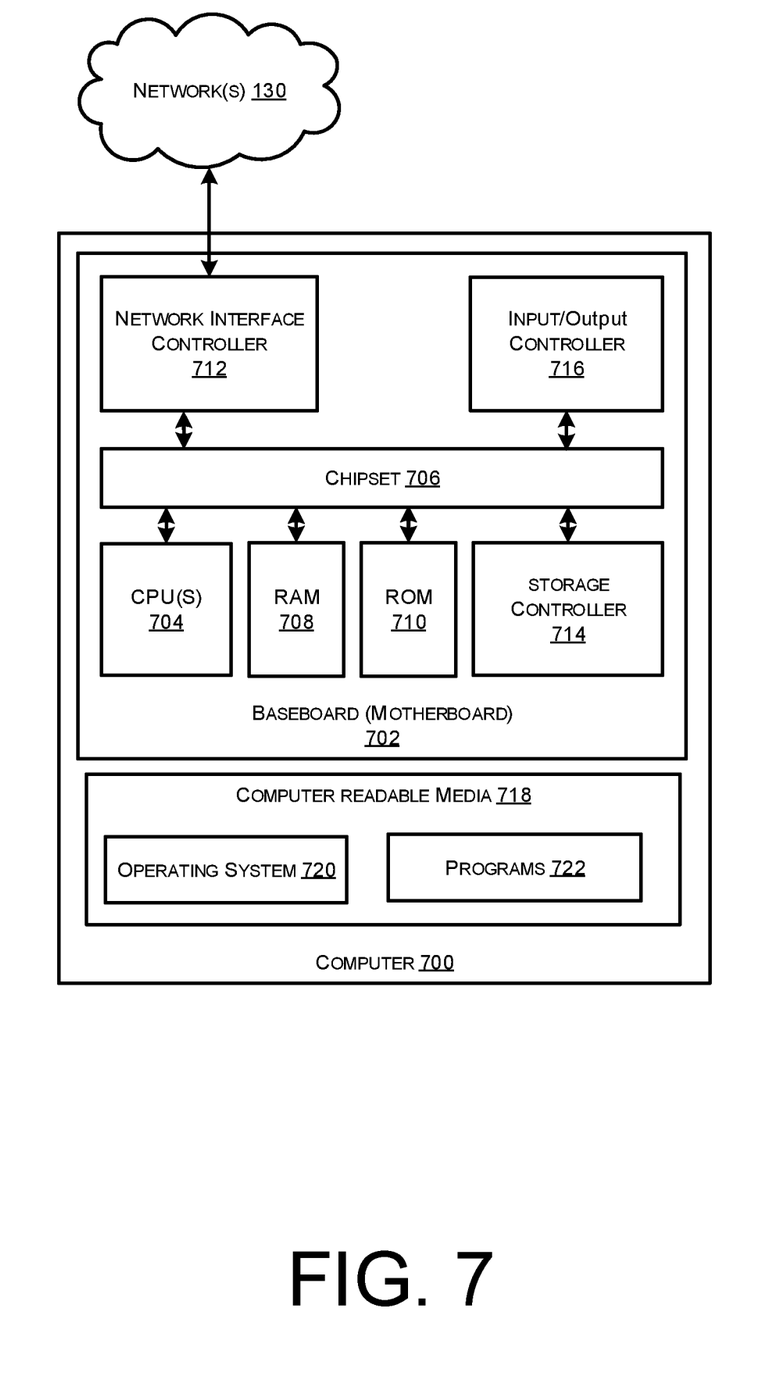
FIG. 7 is a computer architecture diagram showing an illustrative computer hardware architecture for implementing a computing device that can be utilized to implement aspects of the various technologies presented herein.

FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer 700 may, in some examples, correspond to a network switch 116, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 130. The chipset 706 can include functionality for providing network connectivity through a NIC 712, such as a gigabit Ethernet adapter. The NIC 712 is capable of connecting the computer 700 to other computing devices over the network 130. It should be appreciated that multiple NICs 712 can be present in the computer 700, connecting the computer to other types of networks and remote computer systems.

The computer 700 can be connected to a storage device 714 that provides non-volatile storage for the computer. The storage device 714 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, spine switch 116, and or any components included therein, may be supported by one or more devices similar to computer 700. Stated otherwise, some or all of the operations spine switch 116, and or any components included therein, may be performed by one or more computer devices 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 816 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all the components shown in FIGS. 1-6, can include other components that are not explicitly shown in FIG. 7, or might utilize an architecture completely different than that shown in FIG. 7.

As described herein, the computer 700 may comprise a spine switch 116, and/or any other device. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed spine switch 116. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for performing NAT configuration in a fabric or endpoint devices in a local or public network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of traffic management in a network, the method comprising:
   receiving, at a first switch in a network, first traffic from a first application hosted behind the first switch;
   identifying, from the first traffic, a first source tag indicating that the first application generated the first traffic, the first traffic being associated with a source Internet Protocol (IP) address that is different than the first source tag;
   receiving, at the first switch, rules that indicate actions to perform on traffic sent from applications associated with various source tags;
   identifying, from the rules and using the first source tag, a first rule for the first application indicating that the first traffic generated by the first application is to be routed through an intermediate device that performs network address translation;
   sending the first traffic to the intermediate device;
   receiving the first traffic at the intermediate device;
   translating, using network address translation (NAT) at the intermediate device, the source IP address of the first traffic to a second IP address associated with the intermediate device; and
   sending the first traffic to a first destination address indicated in the first traffic.

2. The method of claim 1, further comprising:
   receiving, at the first switch, second traffic from a second application hosted behind the first switch;
   identifying, from the second traffic, a second source tag indicating that the second application generated the second traffic;
   identifying, from the rules and using the second source tag, a second rule for the second application indicating that the second traffic generated by the second application is to be routed through an intermediate device that performs network address translation; and
   identifying, using the second rule and the second source tag, that the second application is a high priority application; or
   identifying, using the second rule and the second source tag, that the second application is a low priority application.

3. The method of claim 2, further comprising:
   replacing a first destination MAC address of the second traffic with a second MAC address that is associated with the high priority application.

4. The method of claim 2, further comprising:
   replacing a first destination MAC address of the second traffic with a third MAC address that is associated with the low priority application.

5. The method of claim 2, wherein the first switch includes a plurality of ports where each of the plurality of the ports is associated with different applications that send traffic to the first switch.

6. The method of claim 5, wherein if the second application is identified to be a low priority application:
   proceeding to process the second traffic in response to a number of available ports of the plurality of ports which are not assigned to any applications is greater than a threshold.

7. The method of claim 5, wherein if the second application is identified to be a low priority application:
   reject processing the second traffic in response to a number of available ports of the plurality of ports which are not assigned to any applications is less than a threshold.

8. The method of claim 7, further comprising:
   starting a timer to measure a second application session; and
   tearing down the second application if a measured time of the second application session is longer than a threshold.

9. The method of claim 2, in response to the second application being identified as a high priority application, proceeding to process the second traffic.

10. The method of claim 1, wherein the first switch is associated to a client Virtual Machine (VM), and the first destination address is associated to a server VM.

11. A method of traffic management in a network, the method comprising:
    receiving, at a first switch in a network, first traffic from a first application hosted behind the first switch;
    identifying, from the first traffic, a first source tag indicating that the first application generated the first traffic, the first traffic being associated with a source Internet Protocol (IP) address that is different than the first source tag;
    receiving, at the first switch, rules that indicate actions to perform on traffic sent from applications associated with various source tags;
    identifying, from the rules and using the first source tag, a first rule for the first application indicating that the first traffic generated by the first application is to be routed through an intermediate device that performs network address translation;
    sending the first traffic to the intermediate device;
    receiving the first traffic at the intermediate device;

translating, using network address translation (NAT) at the intermediate device, the source IP address of the first traffic to a second IP address associated with the intermediate device; and sending the first traffic to a destination address indicated in the first traffic.

12. The method of claim 11, further comprising:

receiving, at the first switch, second traffic from a second application hosted behind the first switch;

identifying, from the second traffic, a second source tag indicating that the second application generated the second traffic;

identifying, from the rules and using the second source tag, a second rule for the second application indicating that the second traffic generated by the second application is to be routed through an intermediate device that performs network address translation;

identifying, using the second rule and the second source tag, that the second application is a high priority application; or identifying, using the second rule and the second source tag, that the second application is a low priority application.

13. The method of claim 12, further comprising:

replacing a first destination MAC address of the second traffic with a second MAC address that is associated with the high priority application.

14. The method of claim 12, further comprising:

replacing a first destination MAC address of the second traffic with a third MAC address that is associated with the low priority application.

15. The method of claim 12, wherein the first switch includes a plurality of ports where each of the plurality of the ports is associated with different applications that send traffic to the first switch.

16. The method of claim 15, wherein if the second application is identified to be a low priority application:

proceeding to process the second traffic in response to a number of available ports of the plurality of ports which are not assigned to any applications is greater than a threshold.

17. The method of claim 15, wherein if the second application is identified to be a low priority application:

reject processing the second traffic in response to a number of available ports of the plurality of ports which are not assigned to any applications is less than a threshold.

18. The method of claim 11, wherein the first switch is associated to a server Virtual Machine (VM), and the destination address is associated to a client VM.

19. A system for managing traffic in a network comprising:

one or more processors; and one or more non-transitory computer-readable media storing computer-executable instructions that, when executed by the one or more processors, cause the one or more processors to:

receive, at a first switch in a network, first traffic from a first application hosted behind the first switch;

identify, from the first traffic, a first source tag indicating that the first application generated the first traffic, the first traffic being associated with a source Internet Protocol (IP) address that is different than the first source tag;

receive, at the first switch, rules that indicate an action to perform on traffic sent from applications associated with various source tags;

identify, from the rules and using the first source tag, a first rule for the first application indicating that the first traffic generated by the first application is to be routed through an intermediate device that performs network address translation;

send the first traffic to the intermediate device;

receive the first traffic at the intermediate device;

translate, using network address translation (NAT) at the intermediate device, the source IP address of the first traffic to a second IP address associated with the intermediate device; and send the first traffic to a first destination address indicated in the first traffic.

* * * * *